US012693270B2

(12) United States Patent
Lieske et al.

(10) Patent No.: US 12,693,270 B2
(45) Date of Patent: Jul. 28, 2026

(54) SYSTEM FOR MONITORING CONTAINERS OR PIPES IN WHICH AT LEAST TWO PHASES OR AT LEAST TWO MEDIA OF ONE PHASE IN THE FORM OF A LIQUID, A GAS AND/OR A SOLID ARE STORED OR TRANSPORTED TOGETHER

(71) Applicant: Fraunhofer-Gesellschaft zur Förderung der Angewandten Forschung E.V., Munich (DE)

(72) Inventors: Uwe Lieske, Dresden (DE); Lars Schubert, Dresden (DE); Bianca Weihnacht, Dresden (DE); Robert Neubeck, Dresden (DE); Tobias Gaul, Dresden (DE); Thomas Klesse, Dresden (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 292 days.

(21) Appl. No.: 18/570,693

(22) PCT Filed: Jun. 1, 2022

(86) PCT No.: PCT/EP2022/064906
§ 371 (c)(1),
(2) Date: Dec. 15, 2023

(87) PCT Pub. No.: WO2022/263173
PCT Pub. Date: Dec. 22, 2022

(65) Prior Publication Data
US 2024/0219351 A1 Jul. 4, 2024

(30) Foreign Application Priority Data
Jun. 17, 2021 (EP) ..................................... 21180026

(51) Int. Cl.
*G01N 29/22* (2006.01)
*G01N 29/04* (2006.01)
*G01N 29/07* (2006.01)

(52) U.S. Cl.
CPC ......... *G01N 29/223* (2013.01); *G01N 29/043* (2013.01); *G01N 29/07* (2013.01);
(Continued)

(58) Field of Classification Search
CPC .... G01N 29/223; G01N 29/043; G01N 29/07; G01N 2291/0258; G01N 2291/02836;
(Continued)

(56) References Cited

U.S. PATENT DOCUMENTS 3,552,191 A 1/1971 Heseding
2009/0229364 A1* 9/2009 Gysling ................. G01B 5/016
73/623

(Continued)

FOREIGN PATENT DOCUMENTS

EP 0935798 A1 8/1999
RO 131152 A0 5/2016

OTHER PUBLICATIONS

European Patent Office, International Search Report and Written Opinion in Application No. PCT/EP2022/064906, dated Sep. 8, 2022, 14 pages, Rijswijk, Netherlands.
(Continued)

*Primary Examiner* — Xin Y Zhong
(74) *Attorney, Agent, or Firm* — Marshall & Melhorn, LLC

(57) ABSTRACT
The system has a plurality of inspection heads in a row arrangement around a container or line. The inspection heads can be fastened to the container or line in question and are connected to an electronic evaluation and control unit by a data and energy-supply cable. The inspection heads can
(Continued)

emit and detect elastic waves. The heads which emit elastic waves are disposed and designed to couple guided waves into a wall of the container in question or of the line, and the electronic evaluation and control unit is designed to carry out damage and crack detection, corrosion and wall-thickness determination, fill-level measurement and/or a functional check of the inspection heads and to control elements which emit waves. The inspection heads can be fastened to the container in question or to the line in question on an outer wall by retaining elements and a clamping device.

8 Claims, 5 Drawing Sheets

(52) U.S. Cl.
CPC ................ *G01N 2291/0258* (2013.01); *G01N 2291/02836* (2013.01); *G01N 2291/02854* (2013.01); *G01N 2291/0289* (2013.01); *G01N 2291/106* (2013.01)

(58) Field of Classification Search
CPC . G01N 2291/02854; G01N 2291/0289; G01N 2291/106; G01N 2291/2634; G01F 1/662; G01F 1/74; G01F 23/296; G01F 1/667
See application file for complete search history.

(56) References Cited

U.S. PATENT DOCUMENTS

| 2011/0271769 | A1 | 11/2011 | Kippersund et al. | |
|---|---|---|---|---|
| 2014/0137662 | A1 | 5/2014 | Heinks et al. | |
| 2016/0011026 | A1* | 1/2016 | Scharnitzky | G01F 1/662 |
| | | | | 248/542 |
| 2020/0086347 | A1* | 3/2020 | Hirao | B06B 1/064 |
| 2020/0132526 | A1* | 4/2020 | Murakami | G01F 1/662 |
| 2021/0324729 | A1* | 10/2021 | Yogeswaren | G01N 29/32 |
| 2022/0178879 | A1* | 6/2022 | Bivolarsky | G01N 29/036 |

OTHER PUBLICATIONS

Zhang et al., Electromechanical Impedance Based Damage Assessment Approach for Metal-nonmetal Complex Structure, 2019 Chinese Control and Decision Conference, pp. 3185-3189, Jun. 3, 2019.

* cited by examiner

SYSTEM FOR MONITORING CONTAINERS OR PIPES IN WHICH AT LEAST TWO PHASES OR AT LEAST TWO MEDIA OF ONE PHASE IN THE FORM OF A LIQUID, A GAS AND/OR A SOLID ARE STORED OR TRANSPORTED TOGETHER

FIELD

The invention relates to a system for monitoring containers or pipes in which at least two phases or at least two media of one phase in the form of a liquid, a gas and/or a solid are stored or transported together.

In particular, this can be oil, gas, water and solid particles carried or contained therein. In the case of two media in one phase, for example two liquids, they should have a different physical density.

BACKGROUND

For various technical applications, it is necessary to check the integrity of containers (aligned vertically or horizontally) or pipelines to ensure safety. Particularly heavily stressed parts of a system, such as weld seams or bends, must therefore be regularly checked for cracks, which is a major challenge.

Wall thicknesses play a major role for containers and pipes in corrosive environments. There is laminar and localized corrosion (e.g. pitting). Both generally require different detection systems. In the oil and gas industry, bends are also subjected to heavy loads from the sediment in the crude oil, which leads to wall thickness erosion.

Furthermore, knowledge of fill levels in containers is of great benefit for various processes in order to be able to run the processes in the optimum range and prevent system failures or accidents. Examples of this application include separators in the oil and gas industry, which gravitationally separate the different phases (solid, liquid, gaseous) from one another.

Crude oil in particular contains all three phases. Sediment and water are retained by a plate in the middle of a container. The oil, as the lighter phase, overcomes the barrier and can then be discharged separately. The gas rises and is collected in the upper region. If the level of the sediments rises to such an extent that they can overcome the barrier, they return to the now purified oil. The process must be interrupted and the container cleaned at great expense. Operators of such separators therefore endeavor to exclude this case. However, the inflows of crude oil contain different proportions of the various phases, so that a time limit is not suitable.

Particularly in the context of oil and gas separators, a variety of measurement techniques are used to determine the thicknesses of the different phases. Floating bodies, pressure sensors, ultrasonic pulse-echo arrangements, electromagnetic radar methods, electrical capacitance methods and radiometric methods have proven their worth in distinguishing between gas and liquid phases and different liquid phases.

Meanwhile, the transition from solid to liquid phases cannot be detected by most sensors, or only under certain conditions. Furthermore, their additional ability to resolve defects is limited. Floats and pressure sensors fail here due to their operating principles. Furthermore, these sensor types must be located inside the separator or in special bypasses, which require design changes to existing systems. It is also not possible to detect potential defects before the container wall fails.

Ultrasonic pulse-echo arrays are usually placed inside the container and record the transit times of the reflections at the phase transitions. Low contrast differences between various liquid phases as well as emulsion or foam formation at the phase boundaries are problematic. This results in a high scattering of the ultrasonic waves, which attenuates the amplitudes of the reflections to below the signal-to-noise threshold. Furthermore, the size of most containers and the associated long travel distances of the ultrasonic waves result in high attenuation, so that such systems have not yet become established for monitoring solid-phase containers.

Conventional ultrasonic or phased array systems are also one of the standards in the non-destructive testing of containers alongside visual inspection, but these are different systems due to the excitation frequencies used and optimized radiation characteristics. In addition, such tests are time-consuming and require specially trained personnel, who can only measure the test area after removing potential insulation and decommissioning the container.

Radar methods, on the other hand, use electromagnetic waves in the gigahertz spectrum and measure the contrast of the relative dielectric permittivity, which is stable against common temperature changes and other process variables. The measuring system must also be attached to the inside of a container and works either as a contactless pulse-echo method similar to ultrasound measurements or as a guided radar using an additional antenna, which must be in contact with the filling. In practice, the latter has shown its ability to dissolve even liquid-solid boundaries, provided that the antenna does not exceed a certain length and is free of process-typical solid deposits such as silt, clay or wax.

Electrical capacitance tomography is based on contactless measurement of the relative dielectric permittivity using several capacitance probes. However, for typical metallic and therefore electrically conductive containers with wall thicknesses in the centimeter range, these must be attached to the inner wall and insulated with an additional layer of plastic. The resulting high engineering effort and the susceptibility of the insulation under the usual abrasive process conditions have so far prevented commercial success in the field of oil and gas separators. Furthermore, a ring-shaped arrangement of the sensors cannot be transferred to vertical separators without a large number of additional sensors.

Methods in which the sensors are positioned outside a container, can detect all three phase transitions and are potentially suitable for the detection of damage growth on container walls are active radiometric measurements using gamma radiation sources and actively excited guided elastic waves (GEW). Gamma measurements are an established method in the industry. Using adapted active gamma radiation sources, the containers and their contents are irradiated with negligible scattering and the spatially resolved energy density is recorded by detectors behind the container. Due to the radiation sources required for large containers and with wall thicknesses in the centimeter range, a high level of radiation protection is generally required for use, especially if the fill level is to be recorded in continuous operation. Furthermore, the radiation sources cannot be switched off, but must be mechanically shielded. This is particularly relevant for accident safety.

Guided elastic waves (GEW) are formed from the superposition of conventional elastic spatial waves in the presence of at least one virtually stress-free surface. In the literature, they are also referred to as guided ultrasonic waves (GUW) or Acousto Ultrasonics (AU). Compared to spatial waves, they have a lower geometric attenuation and the associated high potential for monitoring over longer distances and in larger structures. Excitation and measurement are generally carried out by means of (e.g. piezoceramic) actuators, which form a network applied to the structure, particularly in the context of condition monitoring. This arrangement can be used for a variety of applications, such as crack and damage detection, wall thickness and corrosion monitoring or level measurement. In the context of structural monitoring using GEW or GUW, electromechanical impedance measurement is also used to check the integrity of the sensor network. In particular, it has been shown that the robust centimeter-accurate detection of all possible phase boundaries by a line or ring-like network with sensor distances of several deci-meters is possible if an attenuation tomography approach is used. Other, already patented approaches for fill level deter-mination using GEW or GUW have not yet been able to establish themselves, as these are based either on the transit time measurement of converted spatial waves or a natural frequency measurement. For the transit time measurements, the spatial waves must necessarily be measured after passing the phase to be detected, which is not possible due to the high attenuation of the medium or the long travel distances for large containers. The natural frequencies, on the other hand, require a great deal of calibration measurements for multiphase or complex fillings and an associated instability to unexpected changes in the system.

Thus far, the many possible uses of GEW and GUW have been documented, but not combined in a single system:

Damage and crack detection

Corrosion and wall thickness measurement

Fill level measurement using attenuation tomography

Proof of correct functioning of actuator and sensor by means of impedance measurement The requirements for the test system can be defined as follows:

The system should preferably be applicable for cylindrical pressure vessels in horizontal or vertical arrangement as well as pipelines.

It should be able to take into account the variable size of the test object in terms of length, circumference and wall thickness.

It should be possible to arrange the sensors in a circum-ferential or axial direction, a net-like arrangement also being possible.

A variable sensor distance and a variable number of sensors should be possible.

An operating temperature of up to 120° C. should be possible.

The system should be waterproof, dustproof and explo-sion-proof, so that it can also be used in an offshore environment. The system should also be able to withstand corrosion.

Furthermore, it should not be necessary to weld or glue sensors or waveguides directly to the respective test object. Test objects should not necessarily have to be made of ferromagnetic material, so that containers or pipes made of composite or non-ferromagnetic materials can also be con-sidered.

It should also be possible to connect the sensors in a "dry" way (no volatile substances, maintenance-free), individual sensors should be interchangeable, installation should be simple and can be carried out by general installation per-sonnel, and operation should be possible within the thermal insulation of the test object.

SUMMARY

It is therefore in particular the object of the invention to provide possibilities for comprehensive testing and monitoring of the containers or pipes in question and to be able to proceed flexibly without the need for permanent attach-ment to a respective container or pipe and without the need for modifications to its wall for attachment and monitoring.

According to the invention, this object is solved with a system having the features of the claims. Advantageous embodiments and refinements of the invention can be imple-mented with features set out in the dependent claims.

The system according to the invention is formed with several test heads arranged along an axis in a row or in a plane around a container or a pipe at known distances from each other. The test heads can be attached to the respective container or pipe and are connected to an electronic evalu-ation and control unit via a data line for transmitting measurement and control signals and for the power supply.

The test heads are each formed with at least one elastic wave-emitting element and at least one elastic wave-detect-ing element or at least one elastic wave-emitting and detect-ing element, wherein the elastic wave-emitting elements are arranged and designed to couple guided elastic waves into a wall of the respective container or the respective pipe.

The electronic evaluation and control unit is designed so that measurement signals from the elastic wave detecting elements can be used to detect damage and cracks, deter-mine corrosion and wall thickness, measure the fill level and check the function of the test heads, as well as to control the elastic wave emitting elements.

In addition, the test heads can be attached to an outer wall of the respective container or pipe by means of mounting elements and a tensioning device. The tensioning device can be formed with at least one tensioning strap for this purpose.

However, test heads can also be arranged in rows and columns to form an array.

The test heads can be subjected to a compressive force in the respective retaining element, which acts in the direction of the respective outer wall, so that the elastic wave-emitting and/or wave-detecting elements rest directly against the outer wall or via a coupling layer that rests against the outer wall. This can be realized with a compression spring, which is arranged in the holder and is supported there at least on the side opposite the side on which a test head is arranged.

At least one cylindrical element can be attached to each of the retaining elements, on which the tensioning device engages and with which a compressive force acting in the direction of the outer wall acts on the retaining element. However, two cylindrical elements arranged on two opposite sides of a retaining element are preferred, so that a sym-metrical force effect can be achieved on the retaining ele-ment. The cylindrical elements should be aligned parallel to the surface of the respective outer wall.

It is also advantageous to integrate a preamplifier for measurement signals in each of the test heads so that the recorded measurement signals can be amplified and trans-mitted to the electronic evaluation and control unit, so that even longer distances for measurement signal transmission are no problem.

Advantageously, the electronic evaluation and control unit can be designed to perform electromechanical imped-ance spectroscopy.

The electronic evaluation and control unit can also be designed in such a way that a sequential transmission and evaluation of the electrical voltage and electrical current determined with the elastic wave detecting elements can be carried out to determine an impedance.

Test heads can be arranged in a row or a row and column arrangement.

There can also be several systems on one container or pipe that can be connected to each other.

Test heads can be molded with a polymer, in particular with a resin. This can improve explosion protection.

Based on the aforementioned requirements, an inspection system based on guided elastic shafts is addressed, which can monitor the fill level of containers or pipes with a distributed arrangement of actuators and sensors. The environmental conditions in the oil and gas sector place special demands on development.

To ensure that the system can be easily retrofitted to existing systems and is interchangeable, the system is designed so that test heads with retaining elements can be flexibly attached to the retaining elements for the respective test heads, depending on the type and installation of containers or pipes.

The retaining elements fulfill the task of fixing test heads with actuators, sensors and electronics to the respective container or pipe using a clamping band. However, there are no electronics on the retaining elements and they are not subject to any special explosion protection requirements.

Retaining elements can have a housing with cavities and openings in which test heads can be accommodated and inserted into the housing. They should be made of a corrosion-resistant material with sufficient strength.

An adjusting ring can be fastened and movably guided in the housing as a mechanical receptacle for the actual test head, so that the adjusting ring, to which a test head can be fastened, enables a translational movement of a test head fastened in the retaining element perpendicularly or in the direction of the normal vector to the outer wall of the respective container or pipe. The adjusting ring can be movably mounted in a guide for this purpose. A compression spring, which is also held in the housing, can be used to apply a corresponding constant compressive force to the test head, which acts in the direction of the outer wall.

Magnets (permanent or electric) can also be attached to the housing, which can be used as an installation aid for structures made of ferromagnetic material. For structures made of non-ferromagnetic material, the magnets can be replaced by simple spacers or abutments.

The respective retaining element can be attached to the respective container or pipe using a tensioning strap. The tensioning strap can be guided over cylindrical elements and ensures permanent attachment to the container or pipe, at least as long as this is required. Thanks to the cylindrical elements, no shear forces are transferred to the housing during clamping, thus preventing slippage. A tension lock system can be used to ensure a constant preload over the system's service life. For this purpose, well-known tension lock systems can be used.

A test head should have all the functional components for the emission and detection of elastic waves. It can be designed as a cylinder made of a corrosion-resistant material. The test head can be screwed into the adjusting ring with an external thread. This adjusting ring is initially in a neutral position during installation, i.e. the test head is not in contact with the outer wall of a container or pipe. Once the test head has been installed in the adjusting ring, the assembly can be moved in a guide so that the compression spring presses the test head against the respective outer wall with a constant compressive force when the tensioning strap has been tensioned.

Each test head should be designed in such a way that it can couple elastic waves or guided elastic waves into the respective container or pipe via a (e.g. piezoelectric) actuator as a wave-emitting element and receive them again via a sensor as a wave-detecting element. Sending and receiving is possible by pressing the test head (metal sleeve) directly onto the outer wall. To improve the coupling and decoupling of the guided elastic shafts, a maintenance-free coupling layer made of an elastic material can be arranged between the outer wall and the test head. The coupling layer may have been firmly bonded to the test head during manufacture. The combination of wave-emitting and detecting element is under permanent mechanical pressure in the test head. The entire test head can be encapsulated with a resin system that is certified for explosion protection. This prevents sparks from forming inside the test head. A test head can be hermetically sealed and thus protected against the ingress of water and dust.

To form a network, several test heads can be serially connected to each other via a bus system and connected to the electronic evaluation and control unit. Depending on the orientation, a horizontal or vertical row arrangement can be maintained on the respective outer wall. The data cable for the bus system, which connects the test heads to each other, can be variable in length and additionally routed in a metal conduit to ensure possible explosion protection of the system. The power supply and data line can be realized via a bus system.

An electronic preamplifier, which is integrated into a test head, can amplify the measurement signals and also enables the selection of the respective measurement channel within the measurement chain. Each test head has a wave-emitting and a wave-detecting element. These can be designed as different elements or as one element that combines both functions. At the same time, a self-test can be carried out to check the functionality of a test head. The preamplifier also enables impedance spectroscopy to be carried out, with only one element being operated simultaneously with a very low voltage.

In contrast to conventional impedance measurement, in which electrical current and electrical voltage are measured simultaneously (in parallel), electrical current and electrical voltage can be determined sequentially in the circuit. Wave-emitting elements and wave-detecting elements can be measured separately by switching them on and off. This means that the same measuring channel in the bus system can be used for both measured variables. No additional data lines are required.

The components of wave emitting and detecting elements and the printed circuit board as well as the housing components should be designed in such a way that they can withstand continuous operating temperature of 120° C. without any elements being damaged.

By stringing together the test heads described in the previous section with a freely selectable distance between test heads, up to four possible applications with different statements can be developed:

Evaluation of the functionality of the wave emitting and detecting elements by measuring the electromechanical impedance Measurement of the fill levels in the container or a pipe and detection of the phase boundaries solid-liquid, liquid-liquid (e.g. oil and water) and/or liquid-gaseous by using guided waves and an attenuation tomography approach Determination of the wall thickness along the row arrangement by using guided shafts Detection of macroscopic cracks and localized corrosion through the use of guided waves The integrated measurement of the electromechanical impedance can be used to verify the functionality of the elastic wave emitting and detecting elements embedded in the casting compound. The fact that the impedance of a piezoelectric ceramic, for example, can be influenced not only by the piezoelectric constants but also by the ambient boundary conditions can be utilized. Amplitude and phase changes occur in the impedance spectrum if, for example, the piezoelectric ceramic used has been mechanically damaged by flaking or cracks or if the electrical contact to the electrode is interrupted. Furthermore, changes such as the delamination of the coupling layer or the thermal decomposition of the surrounding casting compound can be detected inside the test head. These effects dominate, as in this case the penetration depth into the container or pipe wall is negligible due to the use of a low-energy signal.

To determine the fill level, guided elastic waves are emitted and detected sequentially between all or optionally only selected pairs of wave emitting and detecting elements along the arrangement of these elements. While the waves propagate in the wall of a container or pipe, they are converted into viscoelastic space waves or surface waves via viscoelastic effects in the presence of a medium in contact with the wall. This effect can be measured as an apparent attenuation of the original guided waves. This can be evaluated along the arrangement of test heads and enables the determination of the position of phase transitions between solid-liquid, liquid-gaseous and liquid-liquid boundaries in the case of a sufficiently viscoelastic contrast. To increase accuracy and reduce the influence of structural features, an empty measurement or reference measurement with an empty container or pipe is optionally possible or can be recommended.

Another measurement option is used to determine the continuous wall erosion caused by surface corrosion. The dependence of the phase velocity on the wall thickness of guided elastic shafts can be utilized. At a constant excitation frequency, a guided elastic wave has different velocities depending on the wall thickness of a wall. Therefore, the measurement of the wall erosion is based on a transit time measurement or the measurement of the phase shift between the wave emitting and detecting elements of a system. The evaluation can be performed integrally between a pair of wave emitting and detecting elements or via a tomographic approach.

In addition to global wall erosion, local changes such as macroscopic cracks and localized corrosion on or in a wall can also be detected. This can be achieved within a test head arrangement of a system or between at least two rows of test heads distributed on the outer wall. The system can be used to sequentially excite a guided elastic wave in the respective wall from the wave-emitting elements and detect it again with the detecting elements. At local changes, guided elastic waves create a stray field that can be detected and evaluated by the system. Subsequent evaluation using tomographic algorithms enables the position and size of the local change to be reconstructed.

All measuring principles and applications can generally benefit from a reference measurement for system calibration. If other fluctuating process parameters are to be expected which significantly influence the propagation of the guided waves (e.g. temperature changes or mechanical process noise in the transmit-receive spectrum), a reference measurement should also be extended over this expected observation space. Correction functions that can be calculated from this subsequently reduce the influence of such process parameters in the measurement signal processing.

The invention allows for non-invasive use, as essential components can be attached to the outside of a container or pipe. Thanks to the mounting concept, the test heads can be easily replaced, which simplifies installation maintenance. Fluctuating fill levels can also be reliably detected at short intervals. The system is suitable for potentially explosive atmospheres. It is also only necessary to partially remove the insulation (strips around the circumference). It is also suitable for other geometries (e.g. vertical separators). The installation can be carried out without test heads. These can only be clicked or screwed into the retaining elements after the retaining elements have been attached and therefore cannot be damaged during the installation of the retaining elements. This is particularly advantageous when working in harsh environments (e.g. oil platforms). The system is modular and scalable (in terms of accuracy and geometry/size of the measurement object) thanks to the selectable number of test heads.

The invention can be used in the oil and gas industry, the chemical industry, in power plants, on waste water tanks, in refineries including filling stations, on hydrogen tanks, on pipelines, i.e. actually all applications with filled containers or pipelines.

DESCRIPTION OF THE FIGURES

In the following, the invention is explained in more detail by way of example.

Shown are.

DETAILED DESCRIPTION

Figure 1:
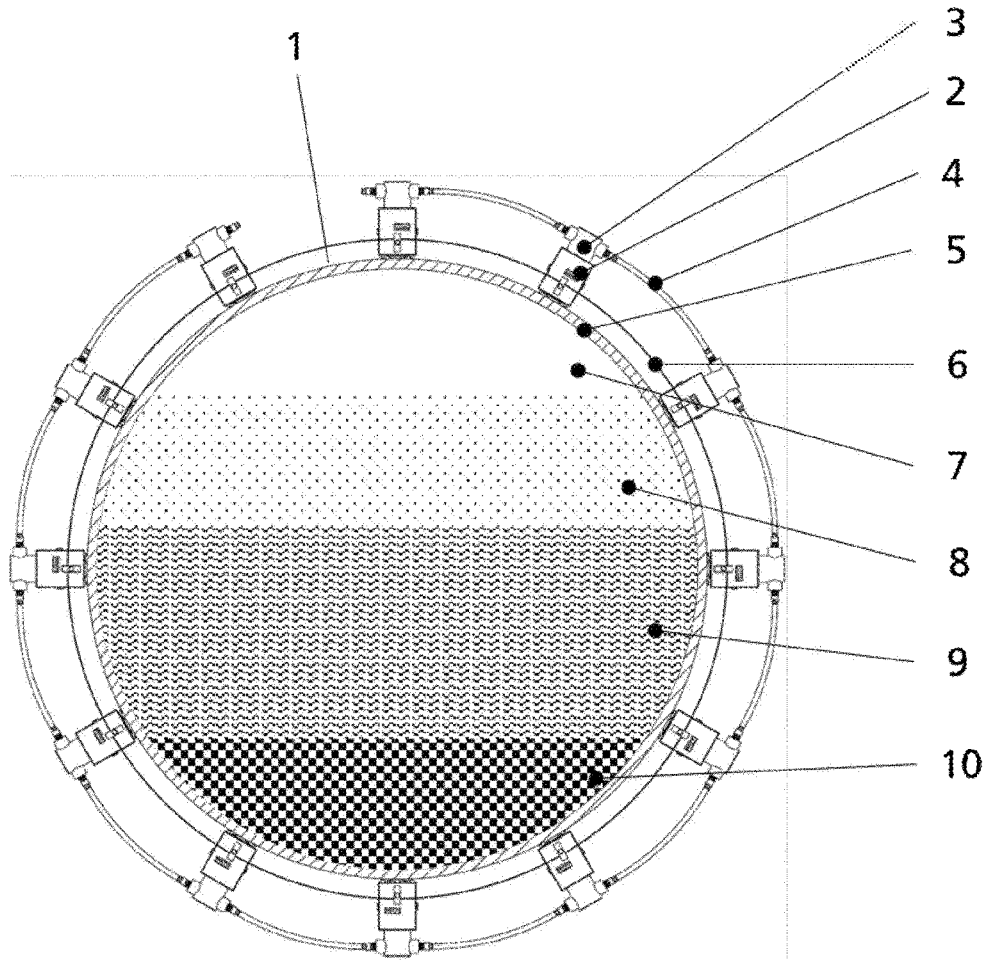
FIG. 1 a container with its central longitudinal axis aligned horizontally with test heads attached to it.

In the example shown in FIG. 1, retaining elements 2, in each of which a test head 3 is held, are attached to the outer wall 5 of the container 1 in a plane distributed around the circumference with a tensioning strap as a tensioning device 6.

Figure 2:
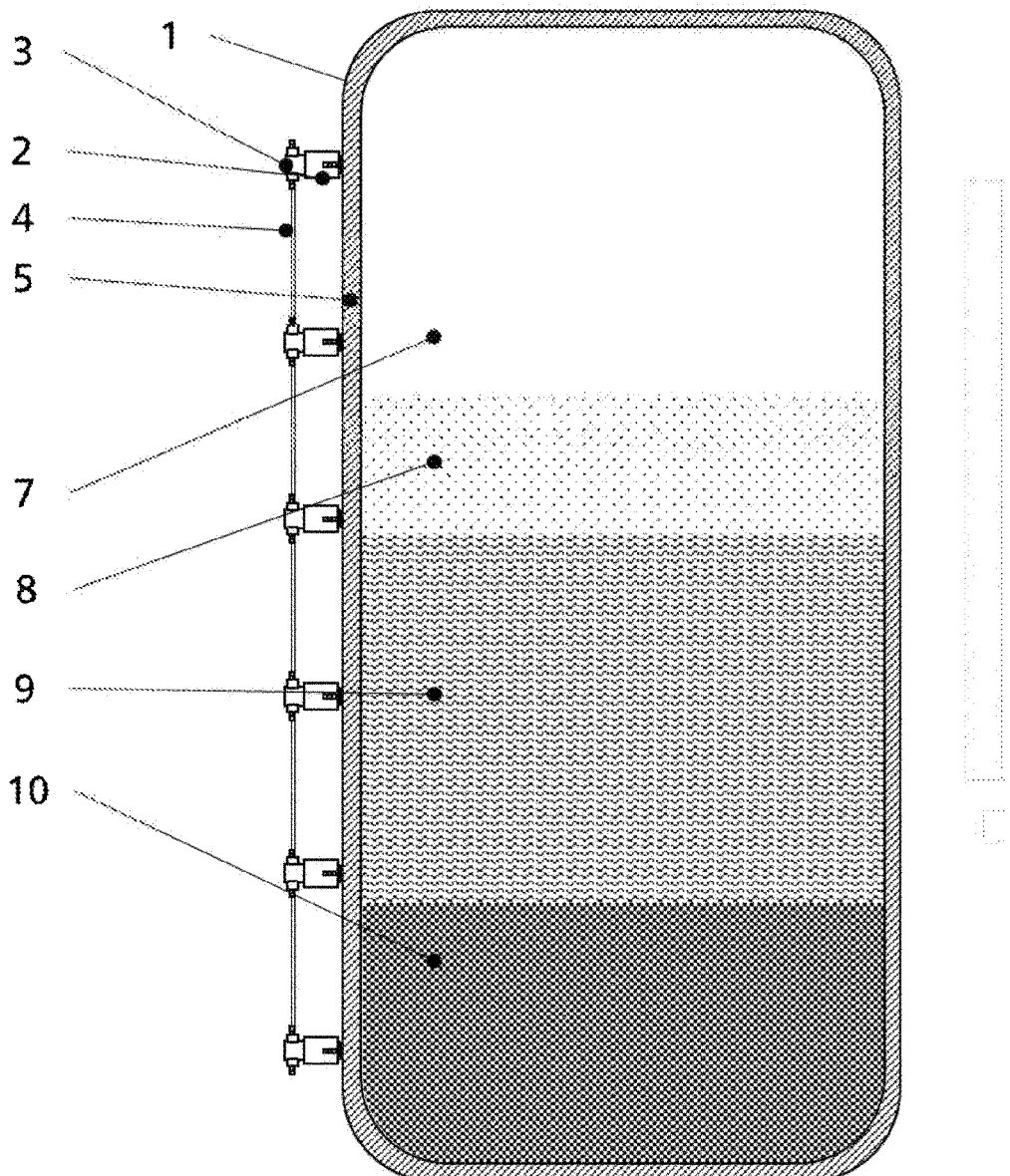
FIG. 2 a container with vertical alignment of its central longitudinal axis with test heads attached to it.

In the example shown in FIG. 2, the retaining elements 2 are fixed with test heads 3 in a row arrangement with vertical alignment.

The containers 1 contain a solid phase 10, water as a liquid 9, oil as a further liquid 8 and a gas 7 in a corresponding arrangement from bottom to top.

The test heads 3 are connected to each other and to an electronic control unit (not shown) via a power supply and data line 4, which should be designed as a BUS connection.

Figure 4:
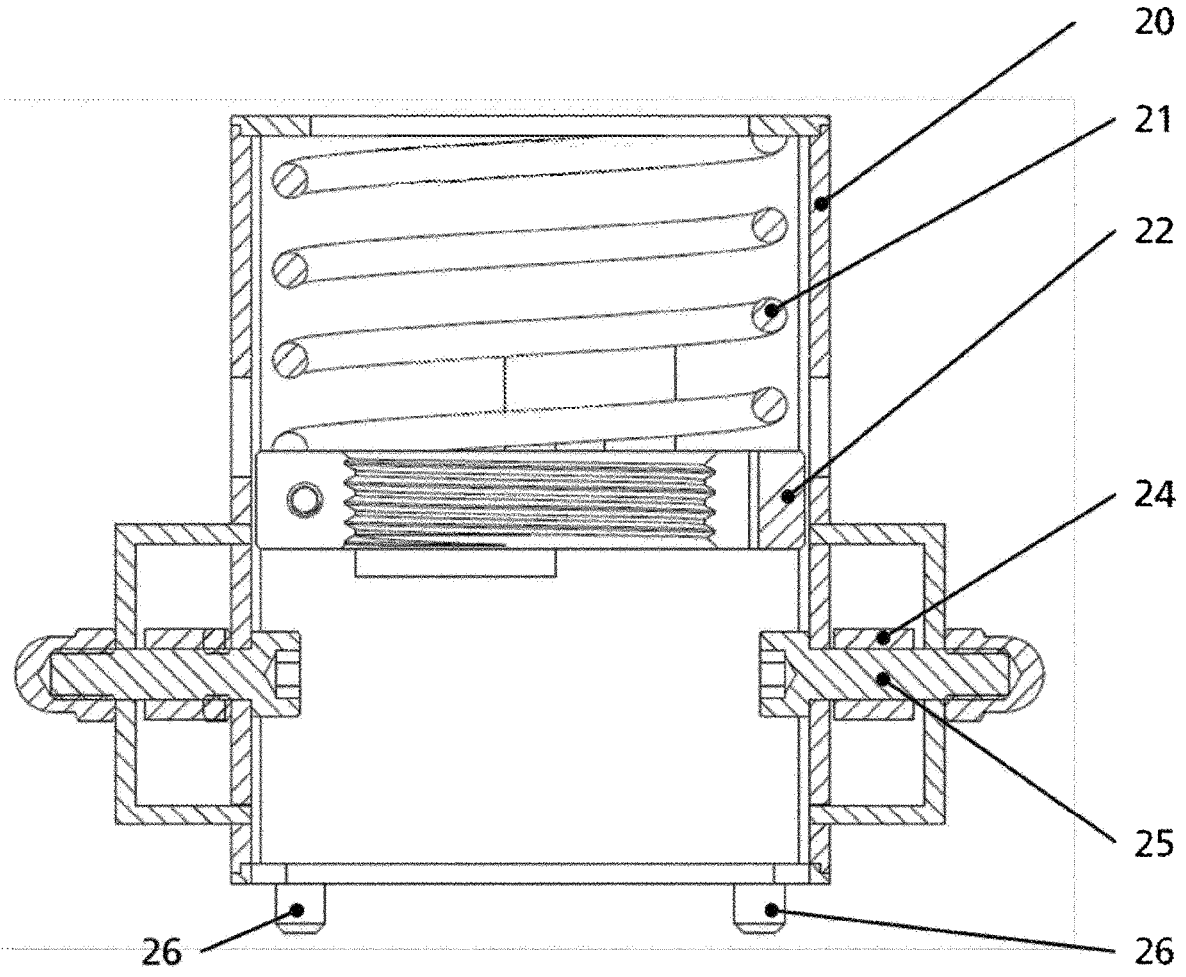
FIG. 4 is a sectional view of an example of a retaining element.

The retaining element 2 shown in FIG. 4 has a housing 20 in which a compression spring 21 is held. The compression spring 21 is supported on one side of the inner wall of the housing. On the opposite side, it engages with an adjusting ring 22, which is guided in the housing 20 via a guide 23 in such a way that a translatory movement of the adjusting ring 22 is possible. A test head 3 can be attached to the adjusting ring 22, for example by means of a screw connection. In this way, a test head 3 can be connected to the retaining element 2 and additionally pressed against the respective outer wall with the compressive force of the compression spring 21.

Two cylindrical elements 24 are attached to the housing 20 with a guide bolt 25 so that they are aligned parallel to the respective outer wall. The tensioning strap can be guided over the cylindrical elements 24 as at least part of a tensioning device 6, so that tensile forces applied with the tensioning strap as at least part of a tensioning device 6 can be transmitted via the cylindrical elements 24 to the housing 20 and a test head 3 attached thereto, so that the test head 3 is pressed with the housing 20 against the surface of the respective outer wall. In this example, the housing 20 is supported by magnets 26 or spacers on the outer wall of a container 1 or a pipe and the housing 20 can be precisely positioned and fixed there in cooperation with the tensioning strap as at least one part of a tensioning device 6.

Figure 5:
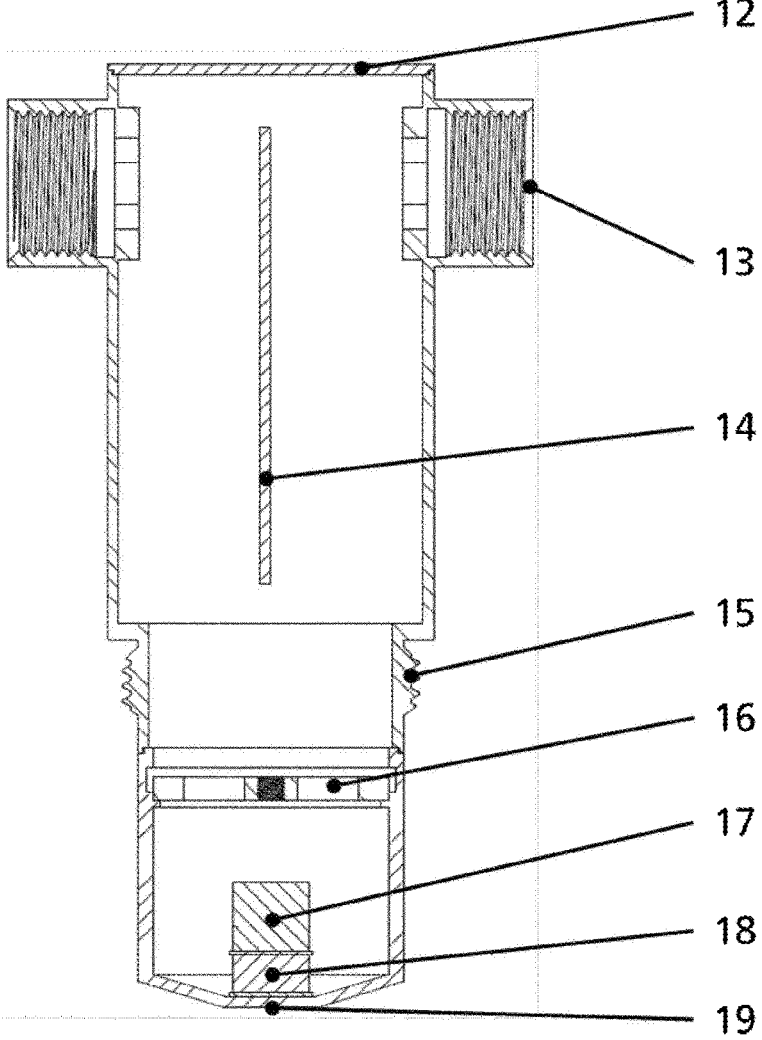
FIG. 5 is a sectional view of an example of a test head.

FIG. 5 shows a sectional view of an example of a test head 3 that can be used in a system according to the invention. The test head 3 has a test head housing that is essentially hollow cylindrical and is closed on one side with a cover element 12.

An external thread 15 is formed in an area of the outer wall of the test head housing, with which the test head 3 can be screwed into the adjusting ring 22.

On the side opposite the cover element 12 there is a coupling layer 19, which can be made of a plastic. The coupling layer 19 can be used to improve the coupling and decoupling of waves into and out of the wall of a container 1 or a pipe. In this example, a wave-emitting element 17 and a wave-detecting element 18 are arranged adjacent to the coupling layer 19.

The test head housing also contains a clamping ring 16, a circuit board with preamplifier 14 and pipes (not shown) via which control signals and measurement signals can be transmitted to and from the elements 17 and 18 to the optional circuit board with preamplifier 14. Cavities in the test head housing can be filled with a polymer resin.

The test head housing also has a connection 13 for a power supply and data line 4.

Figure 3:
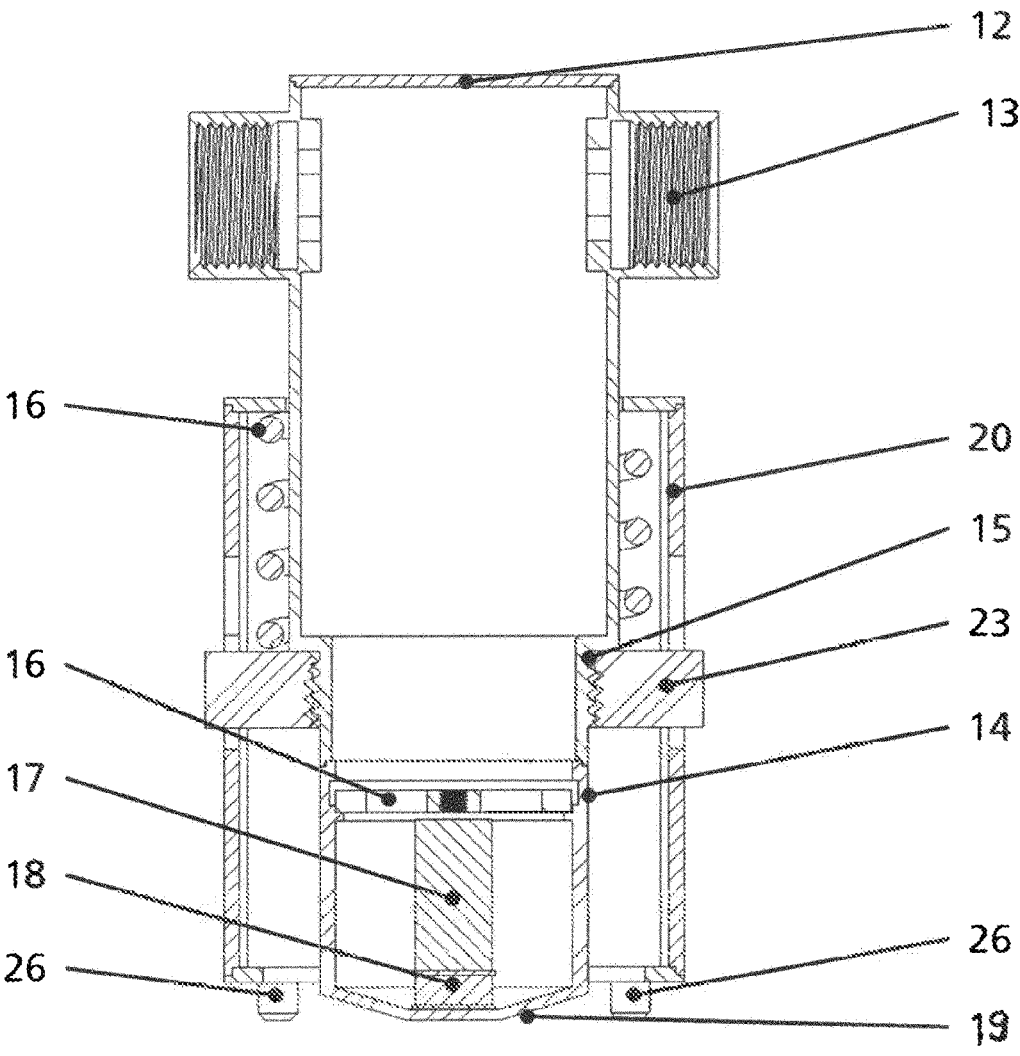
FIG. 3 a test head fixed in a retaining element.

FIG. 3 shows how a test head 3 can be connected to a retaining element 2.

The invention claimed is:

1. A system for monitoring containers or pipes in which at least two phases or at least two media of one phase in the form of a liquid, a gas and/or a solid are stored or transported together, wherein the system is formed with a plurality of test heads arranged in a row along an axis in a series arrangement or in a plane around a container or a pipe at known distances from one another, which test heads can be fastened to respective container or the respective pipe, and are connected to an electronic evaluation and control unit connected to the test heads via a data and power supply line for transmitting measurement and control signals, and the test heads each being formed with at least one elastic wave emitting element and at least one elastic wave detecting element or at least one elastic wave emitting and detecting element, the elastic wave emitting elements being arranged and designed to couple guided waves into a wall of the respective container or the respective pipe, and the electronic evaluation and control unit being designed to use measurement signals from the wave detecting elements to perform damage and crack detection, corrosion and wall thickness determination, fill level measurement and/or a functional check of the test heads and to actuate wave emitting elements, and the test heads can be attached to the respective container or the respective pipe on an outer wall via retaining elements and a tensioning device, wherein the electronic evaluation and control unit is designed to perform electromechanical impedance spectroscopy, wherein the electronic evaluation and control unit is designed to carry out a sequential transmission and evaluation of an electrical voltage and electrical current determined with the elastic wave detecting elements in order to determine electrical current and electrical voltage.

2. The system according to claim 1, wherein the test heads in the respective retaining element can be subjected to a compressive force which acts in the direction of the respective outer wall, so that the elastic wave emitting elements and elastic wave detecting elements bear directly against the outer wall or via a coupling layer which is coupled to the outer wall.

3. The system according to claim 1, wherein a preamplifier for measurement signals is integrated in each of the test heads.

4. The system according to claim 1, wherein the test heads are arranged in a row and/or column arrangement.

5. The system according to claim 1, wherein several systems can be interconnected.

6. The system according to claim 1, wherein the test heads are encapsulated with a polymer.

7. The system according to claim 1, wherein at least one cylindrical element, on which the tensioning device engages, is attached to each of the retaining elements.

8. The system according to claim 1, wherein the tensioning device is formed with at least one tensioning strap.

* * * * *